United States Patent [19]
Harada

[11] Patent Number: 5,602,073
[45] Date of Patent: Feb. 11, 1997

[54] THERMAL TRANSFER SHEET

[75] Inventor: Nobuyuki Harada, Tokyo-To, Japan

[73] Assignee: Dai Nippon Printing Co., Ltd., Japan

[21] Appl. No.: 365,437

[22] Filed: Dec. 28, 1994

[30] Foreign Application Priority Data

Dec. 28, 1993 [JP] Japan .................... 5-349361

[51] Int. Cl.$^6$ .................... B41M 5/035; B41M 5/38
[52] U.S. Cl. .................... 503/227; 428/195; 428/913; 428/914
[58] Field of Search .................... 8/471; 428/195, 428/913, 914; 503/227

[56] References Cited

FOREIGN PATENT DOCUMENTS

| | | | |
|---|---|---|---|
| 0550817 | 7/1993 | European Pat. Off. | 503/227 |
| 59-93391 | 5/1984 | Japan | 503/227 |
| 59-93389 | 5/1984 | Japan | 503/227 |
| 60-53565 | 3/1985 | Japan | 503/227 |
| 61-148095 | 7/1986 | Japan | 503/227 |
| 61-29389 | 12/1986 | Japan | 503/227 |
| 5-262056 | 10/1993 | Japan | 503/227 |
| 6-92040 | 4/1994 | Japan | 503/227 |
| 6-92039 | 4/1994 | Japan | 503/227 |

*Primary Examiner*—B. Hamilton Hess
*Attorney, Agent, or Firm*—Parkhurst, Wendel & Burr, L.L.P.

[57] ABSTRACT

The present invention relates to a thermal transfer sheet which can provide a full-color image having excellent light fastness and heat resistance in a single-color portion as well as in an intermediate color portion and realize excellent reproduction of a wide range of colors. The thermal transfer sheet comprises a long substrate sheet and, provided on the substrate sheet, a plurality of dye layers, the dye layers including a yellow dye layer containing a particular dye and a cyan dye layer containing a particular dye.

7 Claims, No Drawings

THERMAL TRANSFER SHEET

BACKGROUND OF THE INVENTION

The present invention relates to a thermal transfer sheet. More particularly, the present invention relates to a thermal transfer sheet for the formation of a high-sensitivity full-color image, which thermal transfer sheet can reproduce a wide range of colors comparable to various types of color printing extensively used on a commercial scale in the art and can provide an image having excellent light fastness and heat resistance.

Various full-color images have hitherto been formed by offset printing, gravure printing, and the like. These conventional printing methods have a problem in that the cost of equipment is high and large space is required, making it impossible to simply carry out color printing in, for example, small workshops, offices, and the like.

In order to solve the above problem, a proposal has been made for a thermal transfer system where thermal transfer sheets for three primary colors are prepared from sublimable (or thermal migration) dyes and then used to transfer the dyes by thermal energy therefrom to form a color image. Such a system requires neither a large printing machine nor other various types of equipment and can easily form a color image, leading to great expectations of the development thereof in the future.

For the above thermal transfer system, a material, on which an image is to be transferred, and a thermal transfer sheet are put on top of the other, and thermal energy corresponding to image information is applied to the resultant assembly on its one side by means of a thermal head, laser, or the like, thereby transferring dyes present on the thermal transfer sheet onto the material on which an image is to be transferred. In this system, intermediate color tones other than three primary colors of yellow, magenta, and cyan are obtained by transferring the dyes in such a manner that dots of two or three colors out of the three primary colors are put on top of the other or one another.

In the conventional thermal transfer system, three primary colors having excellent light fastness and heat resistance have been selected. Certainly, they have excellent light fastness when used alone. However, when one color dot and one or two other color dots are put on top of the other or one another to develop an intermediate color, interaction between the dyes remarkably deteriorates the light fastness, which is a large problem associated with the formation of a full-color image.

Further, the conventional thermal transfer system has a problem that when the formed full-color image is allowed to stand for a long period of time at a relatively high temperature such as in the summer season, dyes constituting the image are diffused, causing fine portions of the image to become unsharp.

Accordingly, an object of the present invention is to solve the above problems of the prior art and to provide a thermal transfer sheet which can provide a full-color image having excellent light fastness and heat resistance in a single-color portion as well as in an intermediate color portion and realize excellent reproduction of a wide range of colors.

DISCLOSURE OF THE INVENTION

In order to attain the above object, the thermal transfer sheet of the present invention comprises a long substrate sheet and, provided on said substrate sheet, a plurality of dye layers, said dye layers including a yellow dye layer comprising a dye represented by the following formula (Y) and a cyan dye layer comprising a binder and a dye represented by the following formula (C):

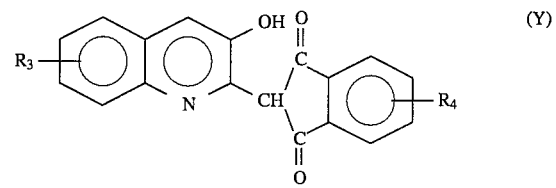

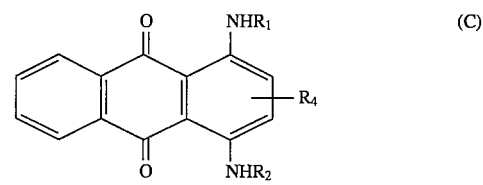

wherein $R_1$ and $R_2$ represent a substituted or unsubstituted alkyl group, a substituted or unsubstituted cycloalkyl group, or a substituted or unsubstituted aralkyl group, $R_3$ represents a substituted or unsubstituted alkyl group, a substituted or unsubstituted alkoxy group, a substituted or unsubstituted alkylcarbonylamino group, a substituted or unsubstituted alkylsulfonylamino group, a substituted or unsubstituted alkylaminocarbonyl group, a substituted or unsubstituted alkylaminosulfonyl group, or a halogen atom, $R_4$ represents a substituted or unsubstituted alkoxycarbonyl group, a substituted or unsubstituted alkylaminocarbonyl group, a substituted or unsubstituted alkoxy group, a substituted or unsubstituted aryloxy group, a substituted or unsubstituted alkyl group, a substituted or unsubstituted cycloalkyl group, a heterocyclic group, or a halogen atom.

The yellow dye according to the present invention has particularly excellent light fastness and, unlike other dye systems, does not cause a lowering in weather resistance of the formed image derived from interaction between different dyes due to catalytic action of light. Further, it features good solubility so that a yellow dye layer having high color density can be obtained.

The cyan dye according to the present invention has relatively good heat resistance and, when used in combinations with other dyes, can offer the same effect as the case where it is used alone.

Specifically, the use of the above yellow dye in combination with the above cyan dye can provide a thermal transfer sheet which can provide an image having excellent light fastness and heat resistance in a single-color portion as well as in an intermediate color (color mixture) portion.

Further, the use of a particular magenta dye disclosed in the present invention can provide a full-color image excellent in various types of light fastness and realize very excellent color reproduction of a wide range of colors.

BEST MODE FOR CARRYING OUT THE INVENTION

The present invention will now be described in more detail with reference to the following preferred embodiments.

A main feature of the present invention is that a thermal transfer sheet, which can provide a full-color image having excellent light fastness and heat resistance in a single-color portion as well as in an intermediate color portion and realize very excellent reproduction of a wide range of colors, is provided by successively forming on a long substrate sheet a plurality of dye layers including a yellow dye layer comprising a particular yellow dye and a cyan dye layer comprising a particular cyan dye.

In the present invention, the yellow dye include dyes represented by the formula (Y), and the cyan dye include dyes represented by the formula (C). For each of the yellow dye and the cyan dye, the above dyes may be used alone or in the form of a mixture of two or more.

Further, the use of a dye represented by the formula (M) in a magenta dye layer can offer a better effect.

Among dyes represented by the following formulae, a dye represented by the formula (Y-1), dyes represented by the formulae (M-3) and (M-4), and a dye represented by the formula (C-2) are particularly preferred respectively as the dye represented by the formula (Y), the dye represented by the formula (M), and the dye represented by the formula (C).

Other dyes may be added to the above preferred dyes. In particular, when the magenta dye is used in the form of a mixed dye, the content of the dye represented by the formula (M-3) or (M-4) in the mixed dye is preferably in the range of from 20 to 80% by weight. In the case of the cyan dye, the content of the cyan dye represented by the formula (C-2) in the mixed dye is not less than 20% by weight (i.e., 20 to 100% by weight). For the mixed dyes, when the content of the dye represented by the formula (M-3) or (M-4) or the content of the dye represented by the formula (C-2) is excessively low, the image formed has lowered heat resistance. On the other hand, when the content of the magenta dye represented by the formula (M-3) or (M-4) is excessively high, the reflection density of the image is lowered and bleeding occurs on a print during storage of the print. In the thermal transfer sheet of the present invention, the magenta dye layer may further comprise at least one member selected from dyes represented by the formulae (M-1) and (M-2), and the cyan dye layer may further comprise a dye represented by the formula (C-1). The incorporation of these dyes in respectively contemplated layers can provide an image having a higher density. It is, of course, possible to further add dyes commonly used in the art for the purpose of adjusting hue in such an amount as will not be detrimental to the effect of the present invention.

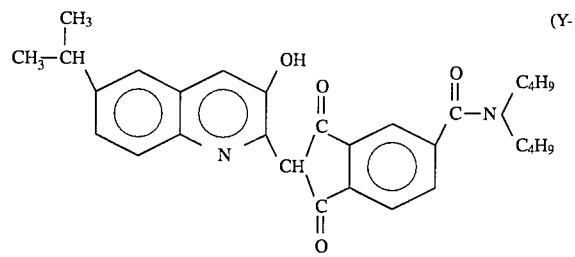
(Y-1)

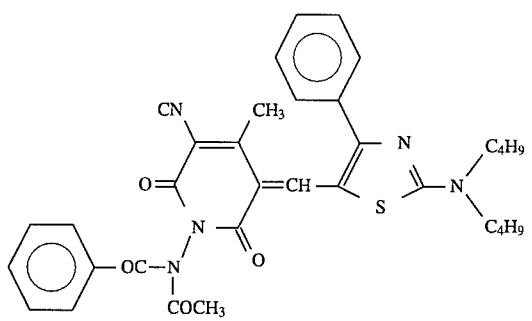
(M-1)

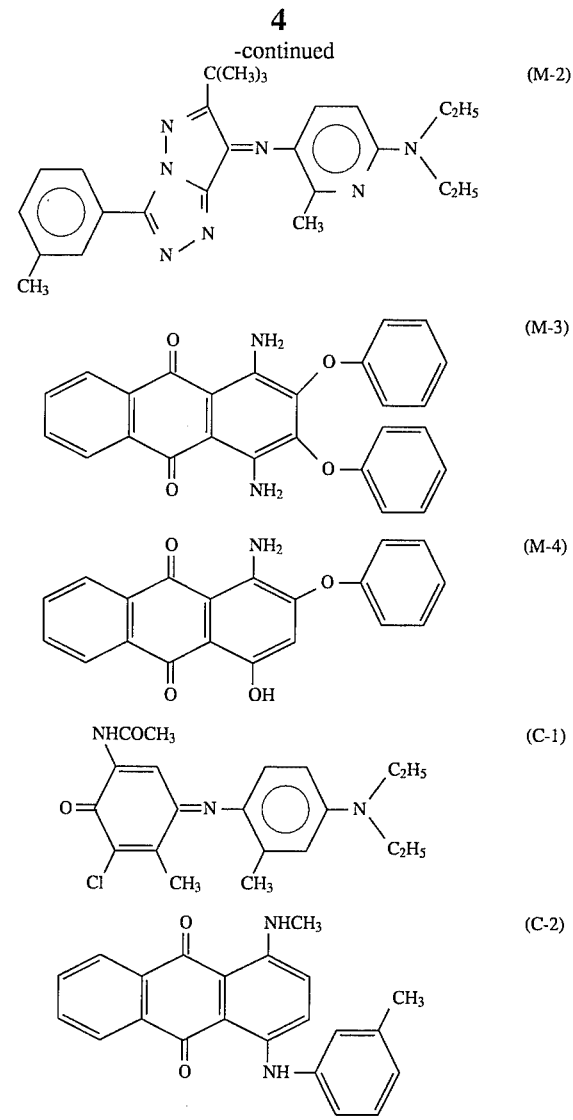

The above dye layers are supported on a substrate sheet by taking advantage of any binder resin.

The binder resin used for supporting the dye layers on the substrate sheet may be any known binder, and preferred examples thereof include cellulosic resins, such as ethyl cellulose, hydroxyethyl cellulose, ethyl hydroxy cellulose, hydroxypropyl cellulose, ethyl hydroxyethyl cellulose, methyl cellulose, cellulose acetate, cellulose acetate burylate, cellulose acetate propionate, and cellulose nitrate, vinyl resins, such as polyvinyl alcohol, polyvinyl acetate, polyvinyl butyral, polyvinyl acetoacetal, polyvinyl pyrrolidone, polystyrene, and polyvinyl chloride, acrylic resins, such as polyacrylonitrile and polyacrylic esters, polyamide resins, polyester resins, polycarbonate resins, phenoxy resins, phenolic resins, epoxy resins, elastomer, and the like. They may be used alone or in the form of a mixture or a copolymer thereof. Further, they may contain various curing agents. Among the above binder resins, polyvinyl butyral and polyvinyl acetal are preferred from the viewpoint of the heat resistance, migration of dyes, and the like.

Further, in the present invention, the following releasable graft copolymers may be used as a release agent or a binder instead of the above binder. The releasable graft copolymer is prepared by grafting, on a main chain of a polymer, at least one releasable segment selected from a polysiloxane segment, a carbon fluoride segment, a fluorinated hydrocarbon segment, and a long chain alkyl segment.

Among the above type of releasable graft copolymers, particularly preferred is a graft copolymer prepared by grafting a polysiloxane segment onto a main chain of a polyvinyl acetal resin.

The above graft copolymer can be produced, for example, by reacting a polysiloxane having a functional group with a diisocyanate to prepare a grafting silicone chain and grafting the grafting silicone chain onto polyvinyl acetal. More specifically, for example, hexamethylene diisocyanate is reacted with a dimethylpolysiloxane having a hydroxyl group in its one terminal in a solvent of a 1:1 mixture of methyl ethyl ketone and methyl isobutyl ketone in the presence of about 0.01–1.0% by weight of a tin catalyst (for example, dibutyltin) at a temperature of about 50° to 100° C. to produce a grafting silicone chain. Then, the grafting silicone chain is reacted with a polyvinyl acetal resin in a solvent of a 1:1 mixture of methyl ethyl ketone and methyl isobutyl ketone to produce a silicone-grafted polyvinyl acetal resin.

When the above graft copolymer is used as a releasing agent for the dye layer, the content of the releasable segment in the release agent is preferably 10 to 80% by weight. When the content of the releasable segment is excessively low, the releasability is unsatisfactory. On the other hand, when it is excessively high, the compatibility with the binder is lowered, causing a problem associated with migration of dyes and the like. When the release agent is added to the dye layer, a single kind of a release agent may be used or alternatively a mixture of a plurality of different release agents may be used. The amount of the release agent added is preferably in the range of from 1 to 40 parts by weight based on 100 parts by weight of the binder resin.

When the amount of the release agent added is excessively small, the releasing effect is unsatisfactory. On the other hand, when it is excessively large, the migration of dyes or strength of the dye layers is lowered and, at the same time, there occur problems of discoloration of dyes in the dye layers and storage stability of the thermal transfer sheet.

On the other hand, when the above graft copolymer is used as a binder for the dye layer, the content of the releasable segment in the binder resin is preferably in the range of from 0.5 to 40% by weight. When the content of the releasable segment is excessively low, the releasability of the dye layer is unsatisfactory. On the other hand, when it is excessively high, the migration of dyes or strength of the dye layers is lowered and, at the same time, there occur problems of discoloration of dyes in the dye layers and storage stability of the thermal transfer sheet.

The constitution of the thermal transfer sheet of the present invention may be the same as that of the conventional thermal transfer sheet, except that, as described above, particular dyes are combined with a binder resin to successively form dye layers of three primary colors on the same plane of the substrate sheet.

The substrate sheet used in the thermal transfer sheet of the present invention may be any conventional sheet so far as it has a certain degree of heat resistance and strength. Examples thereof include paper, various types of converted paper, a polyester film, a polystyrene film, a polypropylene film, a polysulfone film, a polycarbonate film, a polyvinyl alcohol film, and cellophane, the above sheets having a thickness in the range of from 0.5 to 50 μm, preferably in the range of from about 3 to 10 μm. Among them, a polyester film is particularly preferred.

The above dye layers are formed as follows. A dye and a binder resin as described above, and optional ingredients, for example, organic fine particles of polyethylene wax or the like, inorganic fine particles, or the like for modification of coatability and prevention of fusing between the thermal transfer sheet and an image-receiving sheet, are preferably dissolved or dispersed in a suitable solvent to prepare a coating solution or an ink for the formation of a dye layer. The coating solutions or inks for respective dye layers thus prepared are successively coated on the same plane of a wide and long substrate sheet color by color, for example, in the order of yellow, magenta, and cyan, in a given width, for example, a width of about 2 to 70 cm. In this case, the resultant coatings are dried every time when each coating is completed. Thereafter, the resultant coated sheet is cut into a suitable width and rolled as a product.

Further, in the present invention, a black dye layer may be, if necessary, provided.

The black dye layer may be formed by properly mixing together given dyes disclosed in the present invention or alternatively by using other dyes.

In another embodiment, a conventional melt transfer ink layer may be provided adjacent to the dye layers according to the present invention.

The thickness of each dye layer formed in this way is in the range of from 0.2 to 5.0 μm, preferably in the range of from about 0.4 to 2.0 μm. The content of the dye in the dye layer is in the range of from 5 to 70% by weight, preferably in the range of from 10 to 60% by weight.

The above thermal transfer sheet of the present invention, as such, is sufficiently useful for thermal transfer purposes. However, an anti-tack layer, that is, a release layer, may be further provided on the surface of the dye layer. The provision of such a layer can prevent the adhesion between the thermal transfer sheet and a material, on which an image is to be transferred, at the time of thermal transfer, enabling a higher thermal transfer temperature to be used to form an image having a higher density.

For the release layer, mere deposition of an inorganic powder having an anti-tack property has a considerable effect. Further, a resin having excellent releasability, for example, a silicone polymer, an acrylic polymer, or a fluorinated polymer, may be used to form a release layer having a thickness in the range of from 0.01 to 5 μm, preferably in the range of from 0.05 to 2 μm. In this connection, it is noted that the above inorganic powder or releasable polymer exhibits a satisfactory effect also when incorporated in the dye layer.

In the present invention, the dye layers of three or four colors are successively provided on the same plane of a substrate film, and a transferable dye-receptive layer and/or a transferable transparent protective layer may be further provided thereon. The provision of the transferable receptive layer enables a color image to be formed on any material, on which an image is to be transferred, such as paper, even when the material, on which an image is to be transferred, is not dyable with a dye, by first providing a transferable receptive layer on the above material and then allowing dyes to thermally migrate from the dye layers to the receptive layer.

The provision of the transferable transparent protective layer on the same plane of the substrate film enables various types of durability to be markedly improved by transferring the transferable transparent protective layer on the surface of a color image.

The above transferable receptive layer and transferable transparent protective layer are described in detail in earlier patent applications such as Japanese Patent Application No.

44734/1994 and Japanese Patent Laid-Open Publication No. 8558/1993 filed by the same applicant as the present application.

Furthermore, optionally through a primer layer, a heat resistant layer may be provided on the back surface of the thermal transfer sheet for the purpose of preventing an adverse effect of heat derived from a thermal head. For example, a layer comprising a reaction product of polyvinyl butyral with an isocyanate compound and, incorporated therein, a surfactant, such as an alkali metal salt, an alkaline earth metal salt, or the like of a phosphoric ester, and a filler, such as talc, may be provided as the heat resistant layer.

A material on which an image is to be transferred using the above thermal transfer sheet may be any material so far as the recording surface of the material is receptive to the above dyes. When a material having no receptivity to the dye, such as paper, a metal, glass, or a synthetic resin, is used for this purpose, a dye-receptive layer may be formed on at least one surface thereof.

Examples of the material having no need of forming any dye-receptive layer thereon include fibers, woven fabrics, films, sheets, molded products, and the like of polyolefin resins, such as polyethylene and polypropylene, halogenated polymers, such as polyvinyl chloride and polyvinylidene chloride, vinyl polymers, such as polyvinyl acetate and polyacrylic esters, polyester resins, such as polyethylene terephthalate and polybutylene terephthalate, polystyrene resins, polyamide resins, resins of copolymers of olefin, such as ethylene and propylene, with other vinyl monomers, ionomers, cellulosic resins, such as cellulose diacetate and cellulose triacetate, polycarbonates, polysulfones, polyimides, and the like.

Particularly preferred is a sheet or a film of a polyester or a converted paper provided with a polyester layer. Even in the case of paper, metals, glass, and other undyable materials, coating of a solution or a dispersion of the above dyable resin on a recording surface thereof followed by drying, or alternatively lamination of a film of the dyable resin on a recording surface thereof, enables the resultant product to be used as the material on which an image is to be transferred.

Further, even in the case of the above dyable material, a resin having a better dyability may be formed on the surface thereof in the same manner as described above in connection with paper, thereby forming a dye-receptive layer.

The dye-receptive layer formed in the above manner may comprise a single material or a plurality of materials and contain various additives in such an amount as will not be detrimental to the contemplated object.

Although the thickness of the above dye-receptive layer may be any desired one, it is generally in the range of from 3 to 50 µm. Further, the dye-receptive layer is preferably in the form of a continuous coating. Alternatively, it may be in the form of a discontinuous coating formed by using a resin emulsion or a resin dispersion.

The material, on which an image is to be transferred, is basically as described above and, as such, may be used with satisfactory results. However, the above material, on which an image is to be transferred, or the dye-receptive layer may contain an anti-tack inorganic powder. This means serves to prevent the adhesion between the thermal transfer sheet and the material, on which an image is to be transferred, even when the thermal transfer temperature is raised, thus enabling thermal transfer to be carried out with better results. Finely divided silica is particularly preferred.

The above resin having a good releasability may be added instead of or in combination with the above inorganic powder, such as silica. Particularly preferred releasable polymers include cured products of silicone compounds, for example, a cured product comprising an epoxy-modified silicone oil and an amino-modified silicone oil. The above release agent preferably occupies about 0.5 to 30% by weight of the dye-receptive layer.

Further, the above inorganic powder may be deposited on the surface of the dye-receptive layer of the material, on which an image is to be transferred, for the purpose of enhancing the anti-tack effect. Alternatively, it is also possible to provide a layer of a release agent having a good releasability.

The above release layer can exhibit satisfactory effect in a thickness in the range of from about 0.01 to 5 µm and further improve receptivity to dye while preventing the adhesion between the thermal transfer sheet and the dye-receptive layer.

An embodiment wherein a card is used as a material, on which an image is to be transferred, will now be described. A card substrate used in the card according to the present invention is not particularly limited so far as it has on its surface a dye-receptive layer dyable with a sublimable dye. Examples thereof include a film, a sheet, or other forms of conventional various plastics, such as polyolefins, polyvinyl chloride, polyethylene terephthalate, polystyrene, polymethacrylate, and polycarbonate; a white opaque film or foamed sheet prepared by adding a white pigment or a filler to the above synthetic resin and preparing a film or a foamed sheet therefrom; and synthetic paper (polyolefin, polystyrene, or other synthetic paper), wood free paper, art paper, coated paper, cast coated paper, wall paper, backing paper, paper impregnated with a synthetic resin or emulsion, paper impregnated with a synthetic rubber latex, paper with a synthetic resin being internally added thereto, paperboard, cellulose fiber paper, and the like.

Furthermore, it is also possible to use a laminate comprising any combination of the above substrate films.

A preferred embodiment of the card substrate used in the present invention comprises a center core of polyvinyl chloride containing a white pigment and, laminated on both surfaces thereof, a transparent polyvinyl chloride layer. The transparent vinyl chloride layer, which serves at least as an image forming surface, contains a suitable amount of a plasticizer to improve the dyability thereof with a dye.

The amount of the plasticizer based on 100 parts by weight of polyvinyl chloride constituting the image-receptive surface is preferably in the range of from 0.1 to 10 parts by weight, particularly preferably in the range of from 3 to 5 parts by weight. When the amount of the plasticizer used is excessively small, the dyability with a sublimable dye is unsatisfactory, resulting in such an abnormal transfer phenomenon that the dye layer of the thermal transfer sheet, as such, is transferred at the time of thermal transfer. On the other hand, when it is excessively large, the rigidity of the dye-receptive surface becomes unsatisfactory and soft and, at the same time, bleeding occurs in the printed image during storage of the print, so that no sharp image can be provided.

If necessary, the above dye-receptive surface may further comprise coloring pigments, white pigments, extender pigments, fillers, ultraviolet absorbers, antistatic agents, heat stabilizers, antioxidants, fluorescent brightening agents, and the like.

A necessary magnetic recording layer, embossed pattern, printed pattern, optical memory, IC memory, or bar cord, or the like may be previously formed on the surface of the above card substrate. Alternatively, the above magnetic recording layer or the like may be provided after information, such as a face shot, is provided thereon by a sublimation transfer system.

The face shot provided on the card substrate can be formed by a conventional method using the sublimation thermal transfer sheet of the present invention. Further, information, such as letters, may also be formed using the sublimation thermal transfer sheet. However, the information in the form of a letter is preferably formed by using a hot-melt ink thermal transfer sheet which can provide a high-density black print. It is a matter of course that the above face shot and information in the form of a letter may be formed by using separate thermal transfer sheets. From the viewpoint of process, however, it is advantageous for the face shot and the information in the form of a letter to be simultaneously formed using a composite thermal transfer sheet having both a sublimable dye layer and a hot-melt ink layer.

In order to improve the durability of the above recorded information, such as face shot, a protective layer may be laminated by coating of a transparent coating followed by drying, lamination of a transparent film, or use of a thermal transfer sheet having a protective layer or the above thermal transfer sheet with a protective layer and a dye layer being integrally formed thereon. The protective layer may be provided onto the whole surface of the recorded information or alternatively provided on part of the recorded information. Further, the protective layer may be provided separately from recording of the information. However, according to a preferred embodiment of the present invention, a composite thermal transfer sheet comprising a substrate film and, successively provided on the same plane thereof, at least one sublimable dye layer of at least one color, at least one hot-melt ink layer of at least one color, and a protective layer may be used to enable a gradation image, such as a face shot or a landscape, a monotone image, such as a letter or a symbol, and a transparent protective layer to be simultaneously formed using an identical thermal transfer sheet.

When thermal transfer is carried out using the above thermal transfer sheet of the present invention and the above recording material, thermal energy may be applied by any conventional means. For example, a contemplated object can be sufficiently attained by applying a thermal energy of about 5 to 30 mJ/mm$^2$ through the control of a recording time by means of a recording device, such as a thermal printer (for example, a video printer VY-100 manufactured by Hitachi, Limited).

The present invention will now be described in more detail with reference to the following Examples and Comparative Examples. In the Examples and Comparative Examples, "parts" or "%" is by weight unless otherwise specified.

EXAMPLES 1 to 7

Ink compositions respectively for the formation of dye layers of three colors were prepared according to the following formulations. Each composition was coated on a 6 μm-thick polyethylene terephthalate film, which had been treated for rendering the back surface thereof heat-resistant, at a coverage of 1.0 g/m$^2$ on a dry basis to form a coating which was then dried. Thus, thermal transfer sheets for a full color image according to the present invention were prepared. The dyes used were those having the above structures and those having the following structures.

| Ink compositions of three colors | |
|---|---|
| Yellow, magenta, or cyan dye | Amount specified in Table 1 |
| Polyvinyl acetoacetal resin (KS-5 manufactured by Sekisui Chemical Co., Ltd.) | 3.5 parts |
| Methyl ethyl ketone | 45.75 parts |
| Toluene | 45.75 parts |

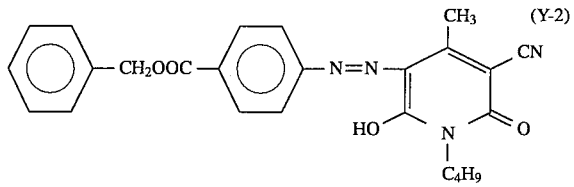

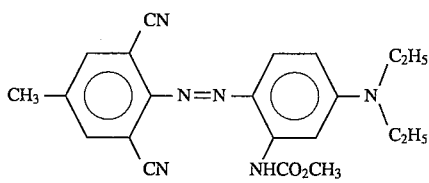

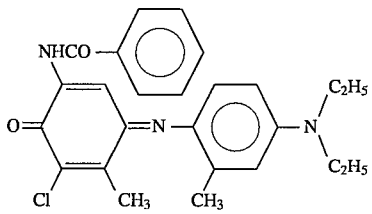

TABLE 1

| Dye | Yellow dye (parts) | Magenta dye (parts) | Cyan dye (parts) |
|---|---|---|---|
| Ex. 1 | | | |
| Y-1 | 5.00 | — | — |
| M-1 | — | 2.50 | — |
| M-3 | — | 0.50 | — |
| M-4 | — | 2.00 | — |
| C-1 | — | — | 4.00 |
| C-2 | — | — | 1.00 |
| Ex. 2 | | | |
| Y-1 | 5.00 | — | — |
| M-1 | — | 2.00 | — |
| M-3 | — | 1.50 | — |
| M-4 | — | 1.50 | — |
| C-1 | — | — | 3.00 |
| C-2 | — | — | 2.00 |
| Ex. 3 | | | |
| Y-1 | 5.00 | — | — |
| M-1 | — | 1.50 | — |
| M-3 | — | 2.00 | — |
| M-4 | — | 1.50 | — |
| C-1 | — | — | — |
| C-2 | — | — | 5.00 |
| Ex. 4 | | | |
| Y-1 | 5.00 | — | — |
| M-2 | — | 2.00 | — |
| M-3 | — | 0.80 | — |
| M-4 | — | 2.20 | — |
| C-1 | — | — | 4.00 |

TABLE 1-continued

| Dye | Yellow dye (parts) | Magenta dye (parts) | Cyan dye (parts) |
|---|---|---|---|
| C-2 | — | — | 1.00 |
| Ex. 5 | | | |
| Y-1 | 5.00 | — | — |
| M-2 | — | 2.00 | — |
| M-3 | — | 0.80 | — |
| M-4 | — | 2.20 | — |
| C-1 | — | — | 3.00 |
| C-2 | — | — | 2.00 |

EXAMPLES 8 to 12

Ink compositions for the formation of dye layers were prepared according to the following formulations. Each composition was coated on a 6 μm-thick polyethylene terephthalate film, which had been treated for rendering the back surface heat-resistant, at a coverage of 1.0 g/m² on a dry basis to form a coating which was then dried. Thus, thermal transfer sheets for a full color image according to the present invention were prepared. The dyes used were those described in Examples 1 to 5.

| Ink compositions | |
|---|---|
| Yellow, magenta, or cyan dye | Amount specified in Table 2 |
| Ethyl celluose resin | 3.5 parts |
| Methyl ethyl ketone | 46.00 parts |
| Toluene | 46.00 parts |

TABLE 2

| Dye | Yellow dye (parts) | Magenta dye (parts) | Cyan dye (parts) |
|---|---|---|---|
| Ex. 6 | | | |
| Y-1 | 5.00 | — | — |
| M-1 | — | 5.00 | — |
| C-2 | — | — | 5.00 |
| Ex. 7 | | | |
| Y-1 | 5.00 | — | — |
| M-1 | — | 3.00 | — |
| M-2 | — | 2.00 | — |
| C-1 | — | — | 4.00 |
| C-2 | — | — | 1.00 |
| Ex. 8 | | | |
| Y-1 | 5.00 | — | — |
| M-1 | — | 2.00 | — |
| M-3 | — | 0.50 | — |
| M-4 | — | 2.00 | — |
| C-1 | — | — | 4.00 |
| C-2 | — | — | 1.00 |
| Ex. 9 | | | |
| Y-1 | 5.00 | — | — |
| M-1 | — | 2.50 | — |
| M-3 | — | 1.50 | — |
| M-4 | — | 1.50 | — |
| C-1 | — | — | 3.00 |
| C-2 | — | — | 2.00 |
| Ex. 10 | | | |
| Y-1 | 5.00 | — | — |
| M-1 | — | 1.50 | — |
| M-3 | — | 2.00 | — |
| M-4 | — | 1.50 | — |
| C-1 | — | — | — |
| C-2 | — | — | 5.00 |
| Ex. 11 | | | |
| Y-1 | 5.00 | — | — |
| M-2 | — | 2.00 | — |
| M-3 | — | 0.80 | — |
| M-4 | — | 2.20 | — |
| C-1 | — | — | 4.00 |
| C-2 | — | — | 1.00 |
| Ex. 12 | | | |
| Y-1 | 5.00 | — | — |
| M-2 | — | 2.00 | — |
| M-3 | — | 0.80 | — |
| M-4 | — | 2.20 | — |
| C-1 | — | — | 3.00 |
| C-2 | — | — | 2.00 |

COMPARATIVE EXAMPLES 1 and 2

The procedures of Examples 1 to 5 were repeated to prepare thermal transfer sheets for a full color image, except that ink compositions for the formation of dye layers having the following compositions were used.

TABLE 3

| Dye | Yellow dye (parts) | Magenta dye (parts) | Cyan dye (parts) |
|---|---|---|---|
| Comp. Ex. 1 | | | |
| Y-2 | 3.00 | — | — |
| M-3 | — | 3.14 | — |
| M-5 | — | 1.26 | — |
| C-2 | — | — | 1.13 |
| C-3 | — | — | 3.37 |
| Polyvinyl acetoacetyl resin | 3.20 | 3.50 | 3.50 |
| Methyl ethyl ketone | 46.90 | 45.05 | 46.00 |
| Toluene | 46.90 | 45.05 | 46.00 |
| Comp. Ex. 2 | | | |
| Y-1 | 5.00 | — | — |
| M-1 | — | 5.00 | — |
| C-1 | — | — | 5.00 |
| Polyvinyl acetoacetal resin | 3.50 | 3.50 | 3.50 |
| Methyl ethyl ketone | 45.75 | 45.75 | 45.75 |
| Toluene | 45.75 | 45.75 | 45.75 |
| Comp. Ex. 3 | | | |
| Y-3 | 5.00 | — | — |
| M-1 | — | 1.50 | — |
| M-3 | — | 2.00 | — |
| M-4 | — | 1.50 | — |
| C-2 | — | — | 5.0 |
| Polyvinyl acetoacetal resin | 3.50 | 3.50 | 3.50 |
| Methyl ethyl ketone | 45.75 | 45.75 | 45.75 |
| Toluene | 45.75 | 45.75 | 45.75 |

TABLE 3-continued

Dye Y-3:

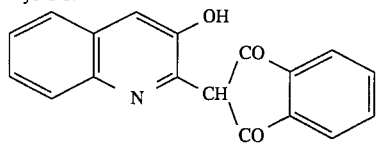

Then, a synthetic paper (Yupo-FPG#150; manufactured by Oji-Yuka Synthetic Paper Co., Ltd.) was used as a substrate sheet, and a coating solution having the following composition was coated on one surface of the synthetic paper so that the coverage on a dry basis was 10.0 g/m$^2$, and the resultant coating was dried at 100° C. for 30 min to form a material on which an image is to be transferred.

| | |
|---|---|
| Vinyl chloride/vinyl acetate copolymer (#1000MT-2; manufactured by Denki Kagaku Kogyo K.K.) | 100 parts |
| Epoxy-modified silicone (X-22-3000T; manufactured by The Shin-Etsu Chemical Co., Ltd.) | 5 parts |
| Methyl ethyl ketone/toluene (weight ratio = 1:1) | 400 parts |

The thermal transfer sheets, prepared in the above Examples 1 to 10 and Comparative Examples 1 and 2, and the above material, on which an image is to be transferred, were put on top of the other in such a manner that the dye layer and the dye-receptive surface faced each other. Recording was carried out by means of a thermal head from the back surface of the thermal transfer sheet under conditions of a head applied voltage of 15.5 V and a printing time of 8.0 msec per line to form full color images of three primary colors. The light fastness and the heat resistance of the resultant images in their single color portion and color mixture portion were measured. The results were as given in Tables 4 to 6.

EXAMPLES 1' to 5'

The procedure of Example 1 was repeated, except that 30 cm-width dye layers of three colors were successively provided on the same plane and, further, a 30 cm-width transferable receptive layer (formed by putting a receptive layer, an intermediate layer, and an adhesive layer on top of one another) and a 30 cm-width transferable transparent protective layer (formed by putting a protective layer, an ultraviolet shielding layer, and an adhesive layer) were provided before the formation of the yellow dye layer, thereby forming thermal transfer sheets of the present invention.

The above thermal transfer sheets each were used to first transfer the transferable receptive layer on the surface of plain paper, and a full-color image was then formed in the same manner as described above. The transferable transparent protective layer was then transferred thereon. The light fastness and the heat resistance of the resultant images in their single color portion and color mixture portion were measured. The results were as given in Tables 5 to 6.

TABLE 4

| | Light fastness (200 kJ/m$^2$: %) | | | | | | | | | | | |
|---|---|---|---|---|---|---|---|---|---|---|---|---|
| | Comp. | Ex. | | | | | | | | | | |
| | Ex. 1 | 1 | 2 | 3 | 4 | 5 | 8 | 9 | 10 | 11 | 12 | 6 | 7 |
| Y | 48 | 91 | 92 | 94 | 91 | 93 | 90 | 91 | 92 | 92 | 91 | 92 | 91 |
| M | 74 | 86 | 87 | 88 | 82 | 82 | 86 | 85 | 87 | 80 | 81 | 79 | 78 |
| C | 82 | 84 | 83 | 84 | 84 | 81 | 85 | 87 | 86 | 85 | 86 | 84 | 83 |
| R–Y | 63 | 82 | 87 | 86 | 92 | 92 | 84 | 86 | 85 | 90 | 92 | 87 | 89 |
| R–M | 44 | 81 | 83 | 81 | 82 | 80 | 81 | 80 | 82 | 81 | 80 | 75 | 76 |
| G–Y | 82 | 98 | 98 | 97 | 98 | 98 | 97 | 97 | 96 | 98 | 97 | 95 | 93 |
| G–C | 55 | 80 | 82 | 82 | 84 | 82 | 85 | 84 | 85 | 86 | 87 | 83 | 79 |
| B–M | 91 | 96 | 97 | 97 | 96 | 95 | 94 | 95 | 94 | 95 | 96 | 90 | 89 |
| B–C | 79 | 81 | 81 | 83 | 81 | 80 | 83 | 84 | 85 | 83 | 85 | 83 | 80 |
| K–Y | 87 | 93 | 94 | 96 | 93 | 91 | 92 | 92 | 93 | 91 | 90 | 94 | 94 |
| K–M | 87 | 96 | 97 | 96 | 95 | 95 | 95 | 94 | 94 | 94 | 93 | 91 | 90 |
| K–C | 61 | 81 | 80 | 85 | 81 | 80 | 82 | 83 | 85 | 84 | 83 | 84 | 81 |
| Bk | 82 | 93 | 92 | 92 | 93 | 91 | 94 | 96 | 95 | 94 | 95 | 89 | 87 |

TABLE 5

| | Light fastness (400 kJ/m$^2$: %) | | | | | | | | | | |
|---|---|---|---|---|---|---|---|---|---|---|---|
| | Comp. | Ex. | | | | | | | | | |
| | Ex. 1 | 1 | 1' | 2 | 2' | 3 | 3' | 4 | 4' | 5 | 5' |
| Y | 33 | 83 | 92 | 83 | 92 | 84 | 93 | 84 | 92 | 84 | 92 |
| M | 50 | 70 | 95 | 71 | 96 | 73 | 96 | 73 | 95 | 72 | 94 |
| C | 62 | 70 | 87 | 72 | 89 | 70 | 92 | 71 | 86 | 72 | 88 |
| R–Y | 42 | 65 | 92 | 73 | 92 | 71 | 94 | 80 | 92 | 80 | 92 |
| R–M | 27 | 60 | 90 | 61 | 92 | 60 | 93 | 62 | 91 | 63 | 92 |
| G–Y | 62 | 96 | 99 | 97 | 98 | 93 | 97 | 95 | 99 | 97 | 98 |
| G–C | 28 | 66 | 88 | 65 | 86 | 66 | 85 | 66 | 86 | 65 | 85 |
| B–M | 83 | 92 | 94 | 92 | 95 | 95 | 98 | 84 | 92 | 84 | 93 |
| B–C | 49 | 64 | 84 | 67 | 82 | 68 | 85 | 62 | 85 | 61 | 84 |
| K–Y | 74 | 93 | 97 | 92 | 96 | 94 | 93 | 91 | 99 | 90 | 98 |
| K–M | 67 | 93 | 98 | 94 | 97 | 96 | 98 | 90 | 94 | 91 | 95 |
| K–C | 33 | 62 | 84 | 65 | 86 | 70 | 85 | 63 | 85 | 62 | 87 |
| Bk | 58 | 81 | 95 | 84 | 98 | 87 | 95 | 80 | 97 | 83 | 96 |

TABLE 6

| | Light fastness (60° C., dry, 200 hr: %) | | | | | | | | | |
|---|---|---|---|---|---|---|---|---|---|---|
| | Comp. | Ex. | | | | | | | | |
| | Ex. 2 | 1 | 1' | 2 | 2' | 3 | 3' | 4 | 4' | 5 | 5' |
| Y | 98 | 97 | 102 | 98 | 101 | 97 | 100 | 98 | 101 | 97 | 101 |
| M | 81 | 98 | 101 | 102 | 102 | 100 | 101 | 99 | 102 | 99 | 101 |
| C | 75 | 88 | 98 | 90 | 99 | 94 | 99 | 90 | 97 | 90 | 98 |
| R–Y | 97 | 100 | 101 | 100 | 101 | 100 | 101 | 99 | 100 | 100 | 101 |
| R–M | 78 | 100 | 102 | 101 | 103 | 100 | 102 | 99 | 101 | 63 | 100 |
| G–Y | 98 | 100 | 102 | 98 | 100 | 99 | 100 | 99 | 101 | 98 | 100 |
| G–C | 73 | 87 | 99 | 91 | 98 | 92 | 101 | 87 | 98 | 90 | 99 |
| B–M | 73 | 100 | 101 | 99 | 100 | 100 | 102 | 99 | 101 | 100 | 102 |
| B–C | 71 | 85 | 98 | 90 | 99 | 93 | 99 | 84 | 98 | 91 | 98 |

TABLE 6-continued

| | Light fastness (60° C., dry, 200 hr: %) | | | | | | | | | | |
|---|---|---|---|---|---|---|---|---|---|---|---|
| | Comp. | Ex. | | | | | | | | | |
| | Ex. 2 | 1 | 1' | 2 | 2' | 3 | 3' | 4 | 4' | 5 | 5' |
| K–Y | 96 | 98 | 103 | 99 | 101 | 99 | 101 | 98 | 100 | 98 | 101 |
| K–M | 78 | 98 | 100 | 98 | 100 | 98 | 100 | 97 | 99 | 99 | 101 |
| K–C | 70 | 88 | 98 | 93 | 98 | 94 | 99 | 87 | 98 | 92 | 99 |
| Bk | 84 | 93 | 98 | 93 | 99 | 95 | 100 | 92 | 97 | 94 | 98 |

Values in tables

Values for yellow, magenta, and cyan represent the percentage retention of each color when these colors were printed to form single-color images.

Values for R-Y to B-C represent the percentage retention of each of Y, M, and C components when two colors among Y, M, and C were successively printed to form secondary colors (R, G, and B).

Values for Bk represent the percentage retention of each of Y, M, C, and Bk components when three colors of Y, M, and C were successively printed to form a tertiary color (Bk).

Evaluation method and criteria for light fastness

Storage conditions (Table 4): xenon lamp, 200 kJ/cm$^2$ (Table 5): xenon lamp, 200 kJ/cm$^2$ The percentage retention after storage was calculated by the following equation.

Percentage retention (%)=(O.D. value after storage/O.D. value before storage)×100

The O.D. (color density) was measured with a densitometer (RD-918) manufactured by Mcbeth, U.S.A.

Evaluation method and criteria for heat resistance

Storage conditions (Table 6): 60° C., dry, 200 hr

The percentage retention after storage was calculated by the following equation.

Percentage retention (%)=(O.D. value after storage/O.D. value before storage)×100

The O.D. (color density) was measured with a densitometer (RD-918) manufactured by Mcbeth, U.S.A.

Comparison of Example 3 with Comparative Example 3

The thermal transfer sheet prepared in Example 3 and the thermal transfer sheet prepared in Comparative Example 3 were used to record an image on the same image-receiving sheet as used in the above examples. Printing conditions were as follows.

The color density was measured with a densitometer RD-918 manufactured by Mcbeth Photographic Film, U.S.A.

Head applied voltage: 15.5 V

Printing time: 8.0 msec/line

Further, the thermal sheet prepared in Example 3 and the thermal transfer sheet prepared in Comparative Example 3 were tested for storage stability under conditions of (1) room temperature and (2) 60° C.×48 hr.

The results were as follows.

| | Max O. D. value of print | | |
|---|---|---|---|
| | Yellow | Magenta | Cyan |
| Ex. 3 | 2.35 | 2.38 | 2.25 |
| Comp. Ex. 3 | 1.65 | 2.38 | 2.24 |

| | Storage stability of thermal transfer sheet | |
|---|---|---|
| | Room temp. | 60° C. × 48 hr |
| Ex. 3 | ○ | ○ |
| Comp. Ex. 3 | Δ (Yellow dye somewhat deposited) | x (Yellow blocked) |

As described above, according to the present invention, a thermal transfer sheet, which can provide an image having excellent weather resistance and heat resistance not only in single colors but also in an intermediate colors, can be provided by forming on a substrate sheet a yellow dye layer and a cyan dye layer using respective particular dyes.

Further, the thermal transfer sheet has excellent storage stability.

Furthermore, use of a favorable particular magenta dye in combination with the above constitution can provide a full-color image having various types of fastness and, at the same time, realize very excellent reproduction of a wide range of colors.

I claim:

1. A thermal transfer sheet comprising a long substrate sheet and, provided on said substrate sheet, a plurality of dye layers, said dye layers including a yellow dye layer comprising a binder and a dye represented by the following formula (Y) and a cyan dye layer comprising a dye represented by the following formula (C):

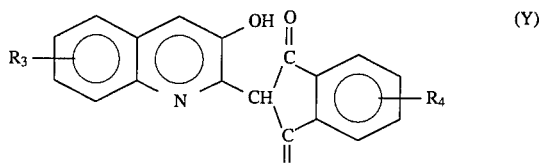

(Y)

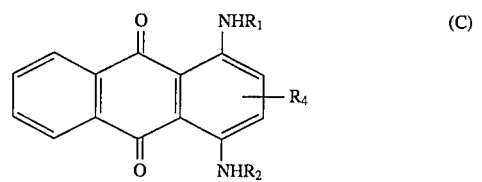

(C)

wherein $R_1$ and $R_2$ represent an alkyl group, a substituted or unsubstituted aryl group, or an aralkyl group, $R_3$ represents a substituted or unsubstituted alkyl group, an alkoxy group, an alkylcarbonylamino group, an alkylsulfonylamino group, an alkylaminocarbonyl group, an alkylaminosulfonyl group, or a halogen atom, $R_4$ represents an alkoxycarbonyl group, an alkylaminocarbonyl group, an alkoxy group, an aryloxy group, an alkyl group, a cycloalkyl group, a heterocyclic groups, a halogen atom, or a hydrogen atom.

2. The thermal transfer sheet according to claim 1, wherein at least one of said plurality of dye layers is a magenta dye layer.

3. The thermal transfer sheet according to claim 2, wherein said magenta dye layer comprises a binder and a dye represented by the following formula (M):

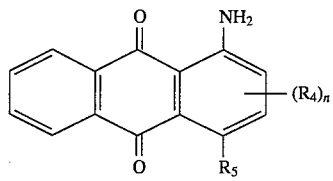

wherein $R_4$ represents a substituted or unsubstituted alkoxycarbonyl group, a substituted or unsubstituted alkylaminocarbonyl group, a substituted or unsubstituted alkoxy group, a substituted or unsubstituted aryloxy group, a substituted or unsubstituted alkyl group, a substituted or unsubstituted cycloalkyl group, a heterocyclic group, or a halogen atom, $R_5$ represents an amino group or a hydroxyl group, and n is an integer of 2 or less.

4. The thermal transfer sheet according to claim 3, wherein said yellow dye is a dye represented by the following formula (Y-1), said magenta dye is a dye represented by the following formulae (M-3) and/or (M-4) and said cyan dye is a dye represented by the following formula (C-2):

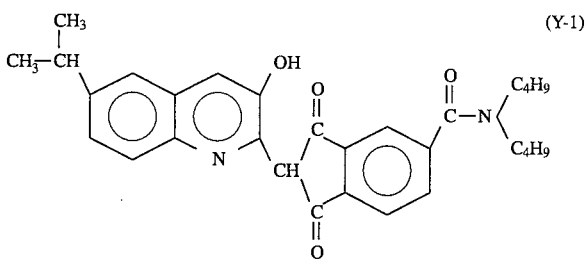

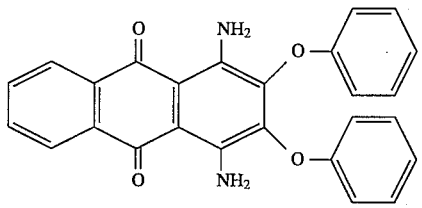

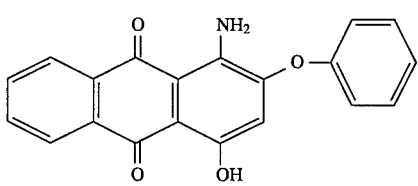

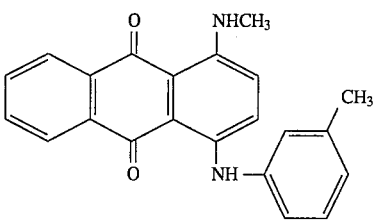

5. The thermal transfer sheet according to claim 3, wherein said magenta dye layer further comprises at least one member selected from the group consisting of dyes represented by the following formulae (M-1) and (M-2) and said cyan dye layer further comprises a dye represented by the following formula (C-1):

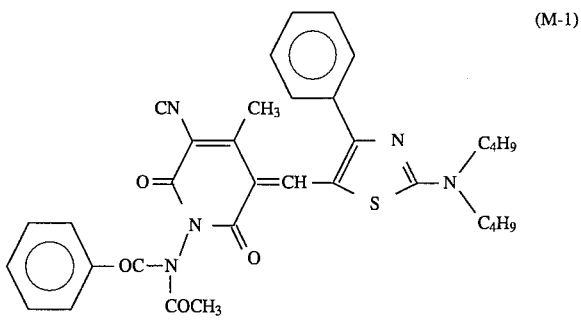

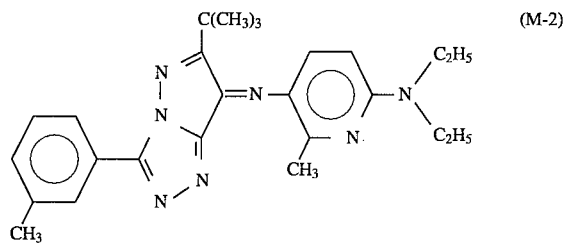

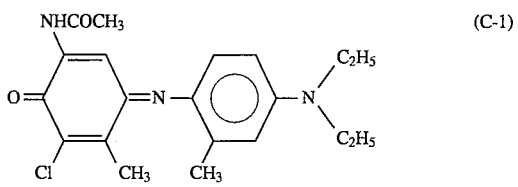

6. The thermal transfer sheet according to claim 2, wherein a transferable dye receptive layer and/or a transferable transparent protective layer are successively provided on the same plane relative to said dyes of three colors.

7. The thermal transfer sheet according to claim 1, wherein at least one of said plurality of dye layers is a black dye layer.

* * * * *